United States Patent [19]

Lemon

[11] 4,325,465
[45] Apr. 20, 1982

[54] AUXILIARY BRAKE FOR TRACTOR-TRAILER RIG

[76] Inventor: Ronald Lemon, 4739 Timon, Corpus Christi, Tex. 78402

[21] Appl. No.: 143,944

[22] Filed: Apr. 25, 1980

[51] Int. Cl.³ .............................................. B60T 1/00
[52] U.S. Cl. .................................................. 188/4 R
[58] Field of Search ..................... 188/4 R, 4 B, 36; 293/7

[56] References Cited

U.S. PATENT DOCUMENTS

| | | | |
|---|---|---|---|
| 294,994 | 3/1884 | Hacklander | 188/36 |
| 850,302 | 4/1907 | Greaser et al. | 188/4 R |
| 1,840,666 | 1/1932 | Grundon | 188/4 R |
| 2,036,910 | 4/1936 | Balensiefer | 188/4 R |
| 2,143,553 | 1/1939 | Hamaguchi | 188/4 R |
| 2,164,834 | 7/1939 | Owen | 188/4 R |
| 2,483,048 | 9/1949 | Hergner | 188/4 R |
| 2,730,196 | 1/1956 | Besoyga | 188/4 R |
| 2,960,191 | 11/1960 | Roberts | 188/4 R |
| 3,722,630 | 3/1973 | Wakabayashi | 188/4 R |

FOREIGN PATENT DOCUMENTS

| | | | |
|---|---|---|---|
| 1085051 | 7/1960 | Fed. Rep. of Germany | 188/4 R |
| 779623 | 1/1935 | France | 188/4 R |

Primary Examiner—George E. A. Halvosa
Attorney, Agent, or Firm—Stevens, Davis, Miller & Mosher

[57] ABSTRACT

An auxiliary braking device for bringing a highway tractor-trailer vehicle or the like to a sudden safe stop is provided. The device has an elongated metal plate member covered with a replaceable non-adherent elastomeric sheet having a surface of high coefficient of friction bolted to the plate member to form a drag shoe. The drag shoe is supported on the frame of the trailer transversely across the trailer in front of the rear wheels by an assembly of pivotally connected metal bars for folding the assembly to form a folded stored configuration below the frame above the road surface and for permitting the assembly to unfold and drop the drag shoe to the road surface where it is rolled on by rear wheels of the trailer upon activation of the support assembly by the operator of the moving vehicle. The folded drag shoe supporting assembly not only drops the drag shoe to the road surface when it is released but also guides the drag shoe into the path of the rear wheels. A winch and locking device are provided for lifting the drag shoe to its stored position and holding it in that position.

7 Claims, 10 Drawing Figures

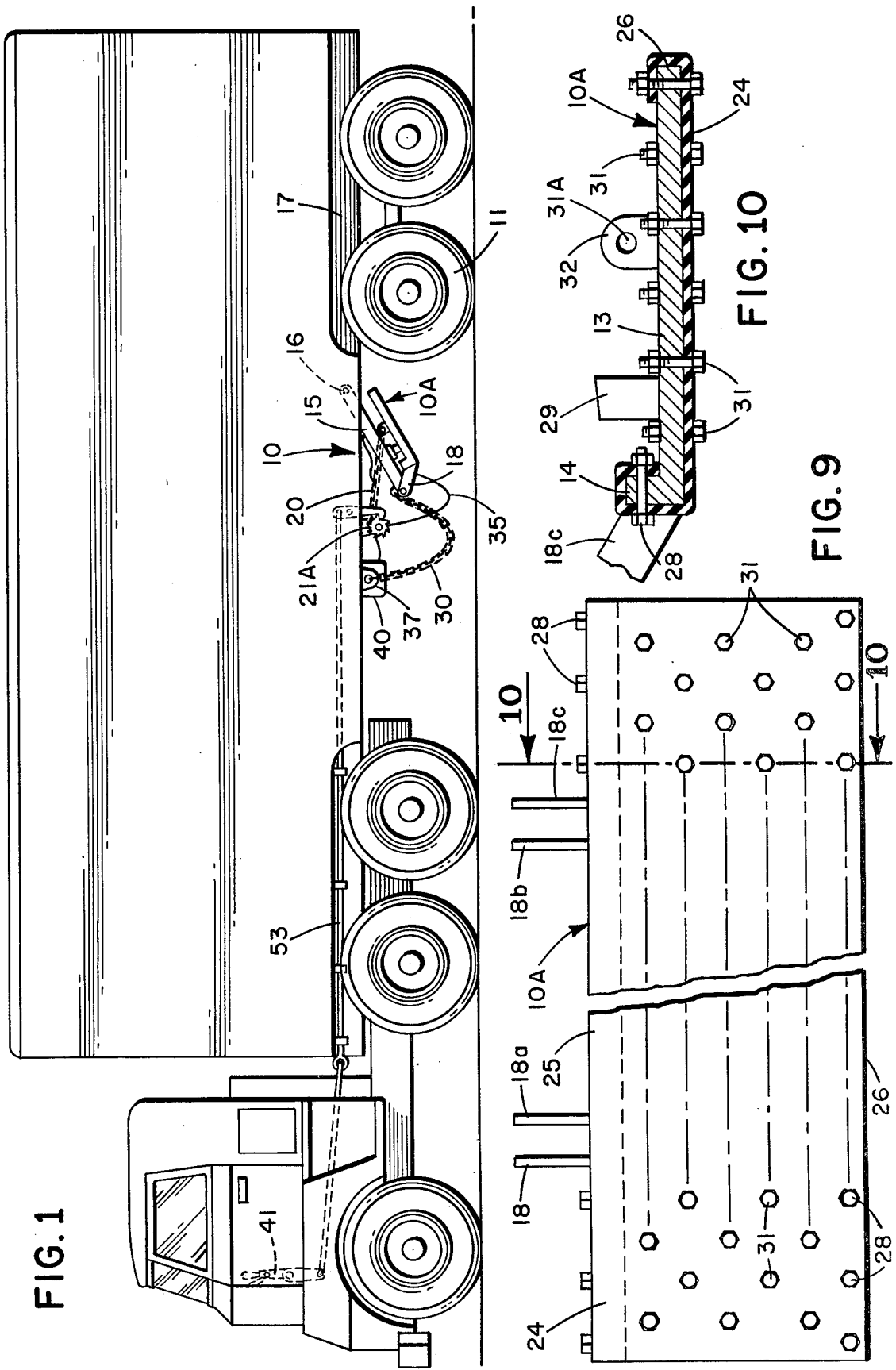

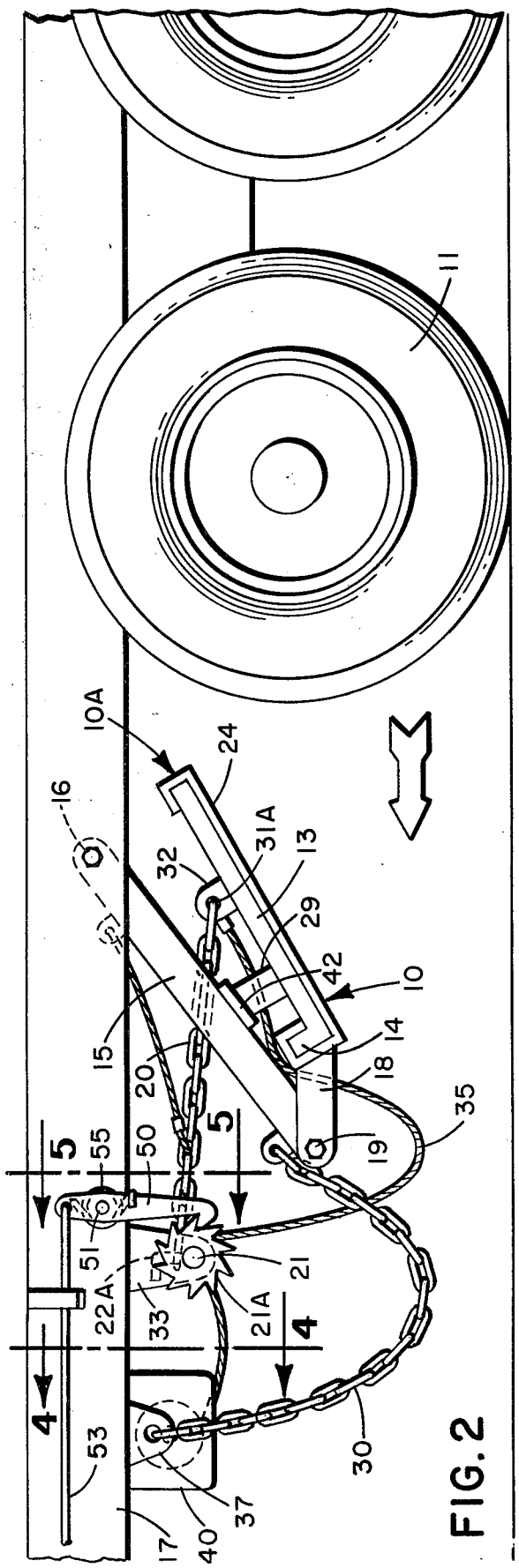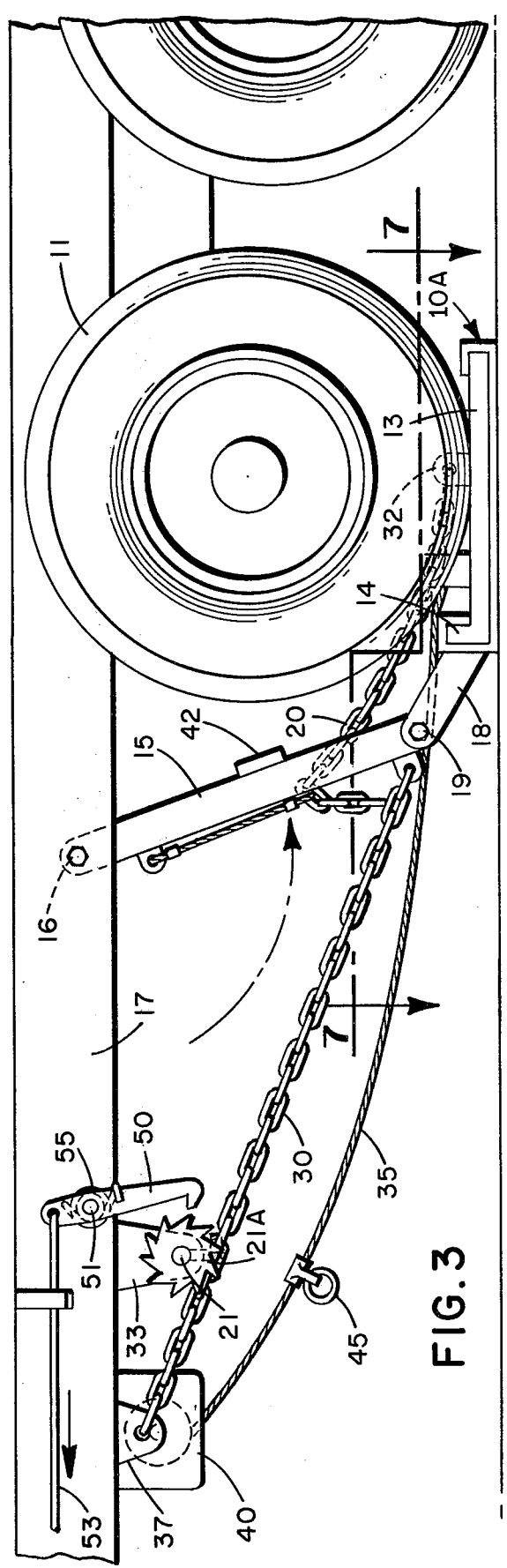

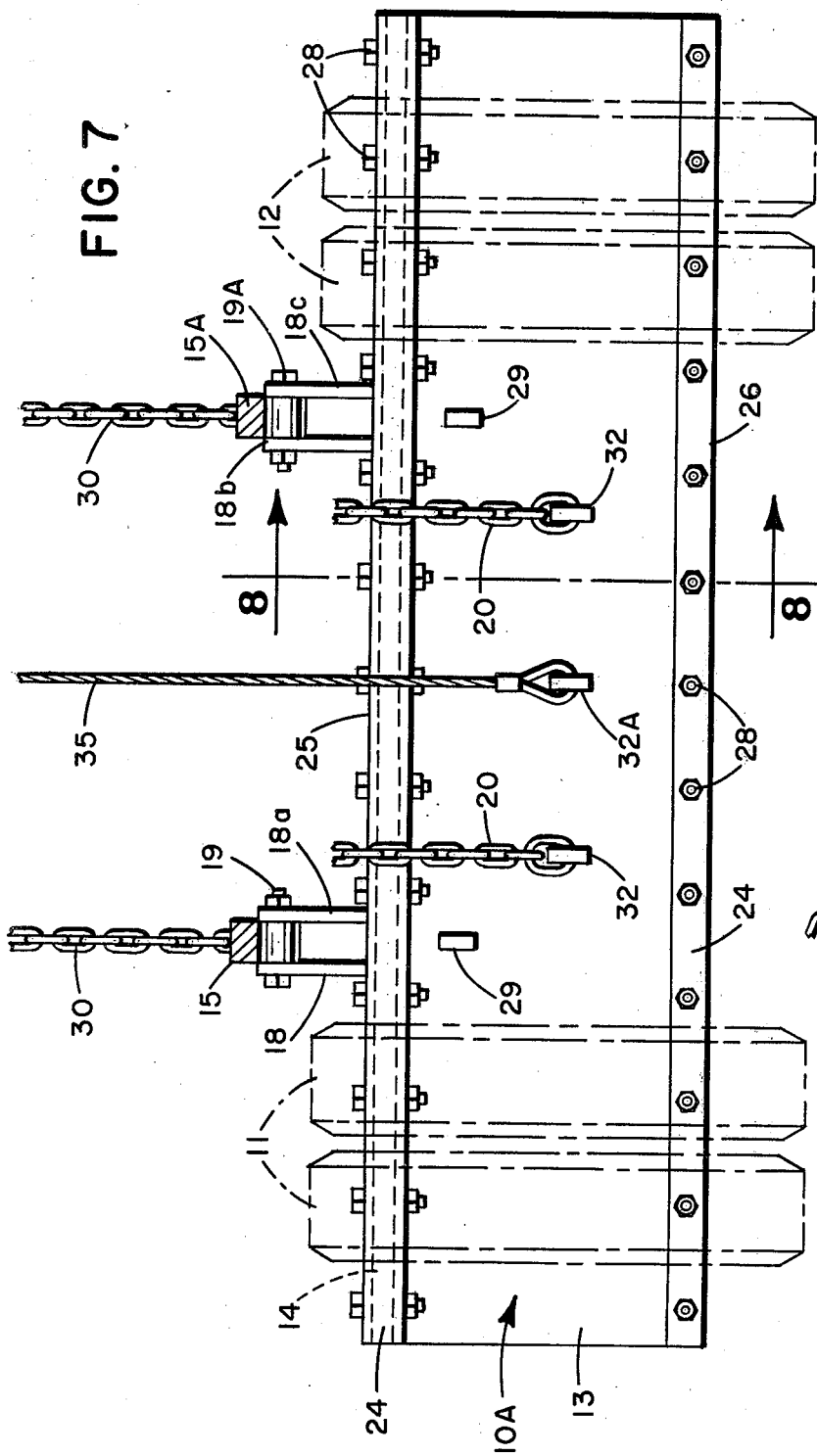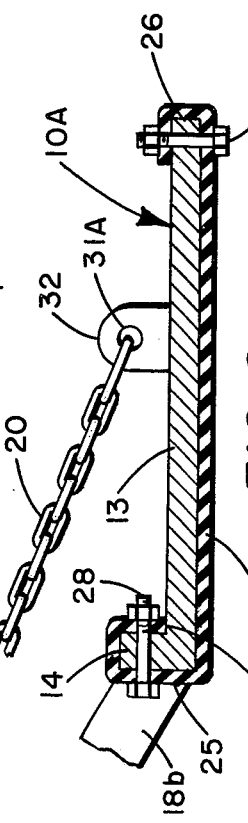

AUXILIARY BRAKE FOR TRACTOR-TRAILER RIG

This invention relates generally to an auxiliary braking device for tractor-trailer rigs and similar vehicles and, more particularly, to a safety brake for actuation when the conventional braking system of the vehicle is inoperable or ineffective. The auxiliary brake is releasably secured near each of its opposite ends to the frame of the trailer where it can be released to fall to the road surface in the path of rear wheels on opposite sides of the vehicle when the primary braking system of the vehicle is inadequate or inoperable.

It has been proposed before to provide a motor vehicle with an auxiliary brake for bringing the vehicle to a sudden stop in the event the vehicle's conventional braking system becomes inoperable because of failure to respond to depression of the brake pedal or because the vehicle is out of control or is skidding on a slippery surface. For example, a brake for use in an emergency is disclosed in U.S. Pat. No. 963,361. The disclosed brake has a chain supported on the vehicle by a swinging frame. Upon release the frame engages one of the rear wheels and the chain falls to a position in the path of the wheel. Another auxiliary brake member having a brake shoe supported in front of a vehicle wheel by a bar and a releasing cable is disclosed in U.S. Pat. No. 1,166,138. This safety brake attachment for motor vehicles has a flexible anti-skid mat to be disposed under a wheel on each side of the vehicle. The mats are connected separately by two chains to a rod which extends transversely beneath the vehicle frame. The brake shoes are released by moving a lever pivotally mounted on the vehicle. The brake shoes are supported on the frame of the vehicle with a rather complicated mechanism and since the brake shoes are separately connected by chains to the transverse rod there is the possibility that the two shoes will not brake wheels on opposite sides of the vehicle simultaneously and thus avoid skidding of the rear wheels to one side from the track of the front wheels of the vehicle. The vehicle braking apparatus disclosed in U.S. Pat. No. 2,605,860 has a chain mat or tread supported on an arm having a pivoted pressure cylinder and piston arrangement. The mat is dropped in the path of one rear wheel of the vehicle by dropping the arm. Another auxiliary braking device having structure for releasably supporting a skate or sliding device in front of a wheel of a vehicle is disclosed in U.S. Pat. No. 2,658,587. Various other auxiliary braking devices for stopping a vehicle when the vehicle's conventional braking system is inoperable or the vehicle is out of control are disclosed in U.S. Pat. Nos. 2,718,283; 2,726,736; 2,730,196; 2,960,191; 3,303,907 and 3,722,630 but the disclosed devices are installed only in the path of one wheel which may result in the rear end of the vehicle skidding to one side as a result of braking on only one side. Some of the auxiliary brakes have molded rubber coverings to slide over the road surface to slow down the vehicle but the covering wears out in service and is difficult to replace because it is bonded to the surface of the brake shoe.

An object of the present invention is to provide an improved auxiliary braking device to be actuated to stop a tractor-trailer rig or the like when the primary braking system of the vehicle is inoperable or the vehicle is travelling on a slippery surface and the tires of the vehicle do not provide the required traction to stop the vehicle without hazardous skidding or jack-knifing of the trailer. Another object of the invention is to provide a simple but effective auxiliary brake for a tractor-trailer assembly having a unitary brake shoe or drag shoe to be dropped in the path of the vehicle's rear wheels which support opposite sides of the trailer and a device for releasably supporting the drag shoe in front of rear wheels on opposite sides of the trailer. Still another object of the invention is to provide a drag shoe to be dropped in the paths of rear wheels on opposite sides of a trailer of a tractor-trailer rig to stop the vehicle when its conventional braking system is inoperable, the drag shoe having a covering of a material having a high coefficient of friction which will effectively brake the vehicle and can be quickly and simply replaced. A still further object of the invention is to provide a drag shoe which is releasably supported on the frame of a motor vehicle such as a trailer of a tractor-trailer rig where it is dropped simultaneously in front of rear wheels on opposite sides of the vehicle to brake the vehicle evenly without undesirable skidding of the rear end of the vehicle to one side. Another object of the invention is to provide a braking device having a brake or drag shoe releasably supported on the frame of a vehicle in front of rear wheels on opposite sides of a motor vehicle which has an effective drag shoe and a simplified mechanism for storing the drag shoe in an inoperable position on the vehicle and for releasing the drag shoe to drop simultaneously in front of rear wheels on opposite sides of the vehicle to bring the vehicle to a sudden stop without skidding or swerving to either side. Still another object of the invention is to provide an anti-skid braking member to be disposed between a vehicle wheel and a road surface having an effective traction providing surface and a simple but quickly responsive mechanism for releasably supporting the drag shoe on the vehicle where it will drop as a unit when released to the road surface in the paths of vehicle wheels on opposite sides of the vehicle.

Other objects will become apparent from the following description with reference to the accompanying drawing wherein FIG. 1 is a side elevation of a tractor-trailer rig showing one embodiment of the auxiliary braking device of this invention in its elevated stored position on the frame in front of rear wheels;

FIG. 2 is an enlarged, fragmentary side elevation showing the auxiliary braking device in its retracted stored position;

FIG. 3 is an enlarged fragmentary view showing the braking device in its operable position;

FIG. 7 is a top plan view of the brake shoe taken along the line 7—7 of FIG. 3;

FIG. 8 is an enlarged section taken along the line 8—8 of FIG. 7;

FIG. 9 is a bottom plan view of a modified brake shoe; and

FIG. 10 is a cross-section taken along the line 10—10 of FIG. 9.

The foregoing objects and others are accomplished in accordance with this invention, generally speaking, by providing an auxiliary braking device for a motor vehicle such as a tractor-trailer assembly for hauling cargo on a highway. The braking device has a brake shoe or drag shoe which is covered with a sheet of elastomeric material having a high coefficient of friction which can be replaced easily and rapidly and a device for releasably supporting the drag shoe on the frame of the motor vehicle. The drag shoe has an elongated unitary metal plate member of substantially uniform width which extends transversely of the vehicle and when in its operable position is disposed under a rear wheel on each side of the vehicle. The drag shoe is swung transversely below the frame of the vehicle as a single unit above the road surface in a folded configuration in front of the rear wheels of the vehicle and is releasably supported on the frame on each side of the vehicle. The drag shoe surface which contacts the road surface when the drag shoe is disposed between the rear wheels and road surface is covered with an abrasion resistant plastic or elastomeric material having a high coefficient of friction removably fastened to the metal plate.

Figure 4:
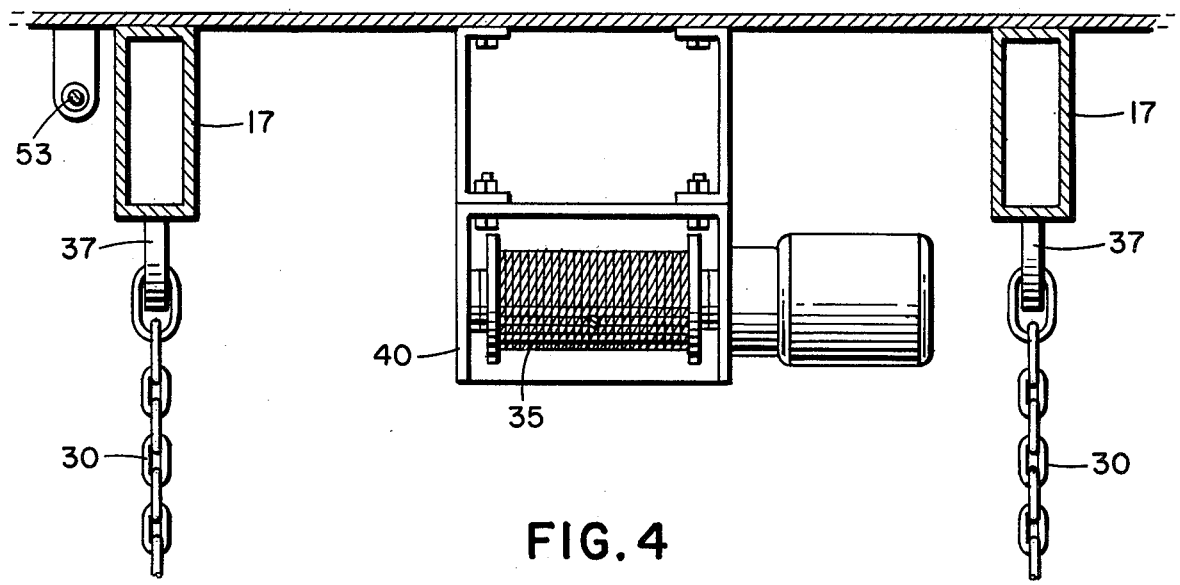
FIG. 4 is an enlarged fragmentary section taken along the line 4—4 of FIG. 2.

Referring now to the drawing, one embodiment of the auxiliary braking device 10 of the invention is illustrated in FIGS. 1, 2, and 3 from one side of a trailer of a tractor-trailer rig. A similar arrangement is provided on the opposite side of the trailer and a unitary drag shoe or brake shoe 10A extends across the trailer as shown in FIG. 7 so that it is between each of pairs of wheels 11 and 12 and the road surface when in its operable position. Drag shoe 10A has a steel plate member 13 provided with an upstanding flange 14 welded thereto along one edge thereof (FIGS. 2, 8 and 10). Steel plate 13 is rectangularly shaped in plan view and is dimensioned to extend as a unit transversely across the vehicle and under the rear wheels on opposite sides of the trailer. When in its operable position, the drag shoe 10A is disposed below the pairs of wheels 11 and 12 on opposite sides of the vehicle as shown in FIGS. 3 and 7. The drag shoe 10A is pivotally stored, when not operable, as shown in FIG. 2, by steel bars 15 and 15a on opposite sides of the trailer pivotally connected by bolts 16 to frame 17 at one end and pivotally connected at their opposite ends between pairs of steel lever arms 18 and 18a and 18b and 18c by bolts 19 and 19a. The spaced pairs of steel lever arms 18, 18a, 18b and 18c are welded at one end to the steel plate 13 and bars 15 and 15a are held at an angle as shown in FIGS. 2 and 4 so the drag shoe 10A will lie substantially flat on the road surface when in its operable position under the trailer wheels. The linkage between drag shoe 10A and the frame 17 is maintained in an easily pivotal condition so that when the drag shoe 10A strikes the ground it will pivot into position in front of the wheels 11 and 12 with its bottom face disposed substantially flat on the road surface and will remain in position as the wheels roll upon it into the position shown in FIG. 3.

As shown in FIGS. 1 and 2, drag shoe 10A is held in front of wheels 11 and 12 in a folded inoperable position by two chains 20. One end of each chain 20 is fastened through opening 31A to an upstanding bar 32. Bars 32 are welded or otherwise fixed to the upper face of plate member 13. The other end of chains 20 are looped about pins 22A, 22B on shaft 21, the axle of ratchet 21A, (FIG. 5) to hold the drag shoe 10A and supporting assembly in their folded positions. Rod 21 is supported horizontally under the trailer frame by bracket plates 33 welded to frame members 17. Ratchet 21A is locked in position to support the weight of the drag shoe 10A by pawl 50 pivotally mounted on pin 51 and biased to engage ratchet 21A by spring 55 to the position shown in FIGS. 1 and 2. To release pawl 50 to permit drag shoe 10A to fall from its position shown in FIG. 2 to the road surface, the operator of the vehicle moves lever 41 to release pawl 50 and permit shaft 21 to rotate and release chains 20 from hooks 22A and B.

Figure 5:
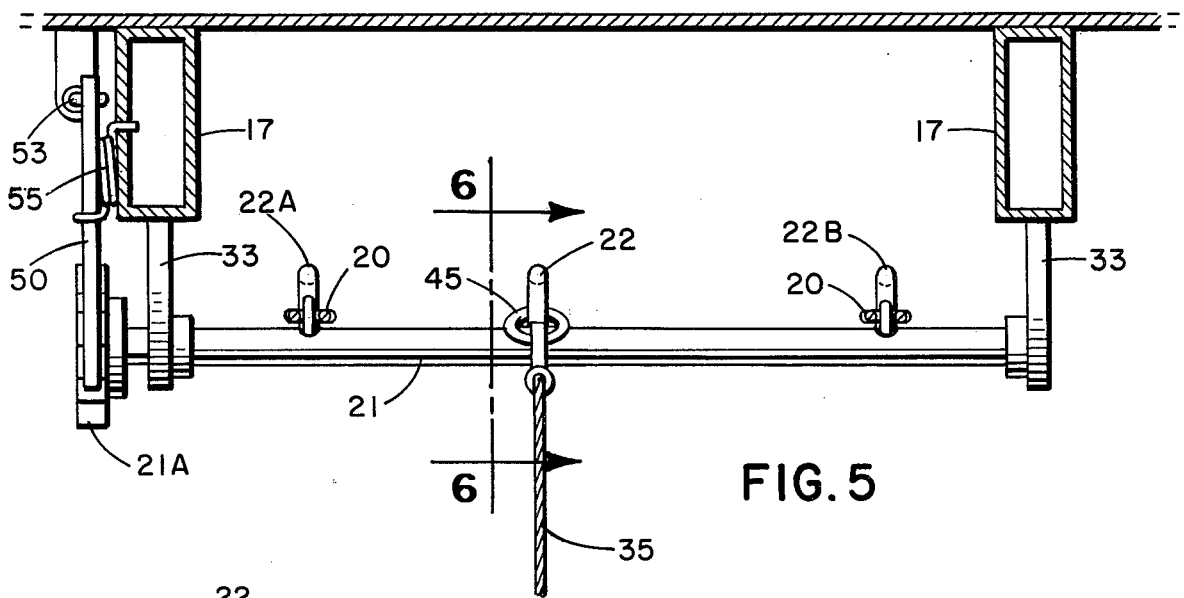
FIG. 5 is a fragmentary section taken along the line 5—5 of FIG. 2.
Figure 6:
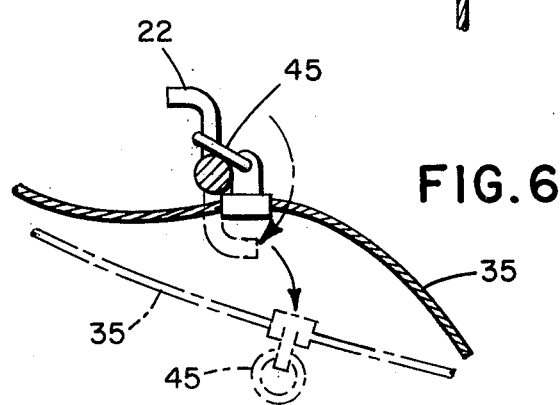
FIG. 6 is a fragmentary section taken along the line 6—6 of FIG. 5.

Cable 35 for the drum of winch 40, is fastened to hook 22 by a ring 45 attached to cable 35 and is fastened to bar 32A of drag shoe 10A as shown in FIGS. 2, 4 and 5. Winch 40 which may be mechanically or electrically actuated winds up cable 35 to lift brake shoe 10A to its inoperable position illustrated in FIG. 1. Ring 45 is fastened to hook 22 while brake shoe 10A is stored. Cable 35 is slack between hook 22 and brake shoe 10A as indicated in FIGS. 1 and 2 when the brake shoe 10A is stored. Hooks 22, 22A and 22B are welded to horizontal shaft 21 which is rotated under the weight of the drag shoe 10 when pawl 50 is released by the rig driver from his seat in the cab. When pawl 50 is released by the driver moving handle 41 to release chains 20, the drag shoe 10A falls to a position in front of pairs of wheels 11 and 12 which roll to the position shown in FIG. 3 with respect to wheels 11 and 12.

Chains 30 are fastened at one end to the lower ends of bars 15, 15A and at their opposite ends to bars 37 welded to trailer frame member 17. When the brake shoe 10A falls to its operating position shown in FIG. 3, chains 30 prevent bar 15 from pivoting too far to the rear to insure that drag shoe 10A falls in front of wheel 11.

The pivoting supporting structure for drag shoe 10A described with reference to FIGS. 2 and 3 is duplicated on the opposite side of the trailer.

After the vehicle has been brought to a stop, the driver of the vehicle backs the vehicle off of the drag shoe 10A and activates the winch 40 to shorten cable 35 and lift drag shoe 10A back to its stored position. Chains 20 are then again secured to hooks 22A and 22B to hold chains 20 taut and support drag shoe 10A in its stored position. The winch 40 is then reversed to pay out slack in cable 35, as shown in FIGS. 1 and 2.

When lever 41 is moved by the driver, chains 20 and cable 35 are dropped from the hooks 22, 22A and B on rod 21, releasing bars 15, 15A, which pivot under the weight of drag shoe 10A which pivots downward on bolts 16. When the drag shoe strikes the ground, it rotates about bolts 19 to a position flat on the road surface in front of the wheel which then runs on drag shoe 10A to the position shown in FIG. 3. Friction between the under face of drag shoe 10A and the road surface stops the vehicle. Since the drag shoe 10A extends as a unit under the vehicle frame and is secured to the frame on opposite sides of the vehicle, it drops simultaneously in front of rear wheels on opposite sides of the vehicle to bring the vehicle to an even stop without skidding or swerving.

As shown in FIG. 8, drag shoe 10A has a steel plate 13 with a flange 14 along its leading transversely extending edge 25 (i.e., edge facing the front of the vehicle). A rubber sheet 24 completely covers that face of plate 13 which contacts the road surface, extends around the trailing edge 26, around leading edge 25 and around flange 14 with its edge 27 disposed against the upper face of plate 13. Laterally spaced bolts 28 secure rubber sheet 24 to plate 13 by passing through flange 14 and, as shown in FIG. 8, adjacent to the trailing edge 26. Stop members or posts 29 are fixed to the upper face of plate member 13 near its transverse leading edge. The heights of posts 29 are sufficient to strike resilient pads 42 carried by bars 15, 15A to stop drag shoe 10A in its folded position as shown in FIGS. 1 and 2 without it becoming so tightly folded that it will bind and not unfold under the weight of drag shoe 10A when released.

Studs or bolts 31 may be inserted through rubber sheet 24 and plate 13 (FIGS. 9 and 10) to provide added traction in snow or on an ice covered surface. Metal studs 31 are bolts which extend through sheet 24 and plate 13. In one embodiment studs 31 may be similar to those installed commercially in snow tires to improve traction on an icy surface instead of bolts and nuts as illustrated in FIG. 10. Rubber sheet 24 is not required if bolts 31 are installed and can be eliminated, if desired. Bolts 31 are distributed substantially uniformly across the face of drag shoe 10A.

As stated above, drag shoe 10A is stored when not in use in the position shown in FIG. 1 with loops of chains 20 hooked on hooks 22A and 22B with the lengths of chains 20 between ratchet axle 21 and bars 15, 15A being such that the lower end of bar 15, 15A and drag shoe 10A are held above the road surface in front of wheel 11 as shown in FIG. 1. As described above, when lever 41 is released, chains 20 drop off the rotated hooks, 22A and B and chains 30 lose their slack configuration of FIG. 2 and have their extended position of FIG. 3, bars 15, 15A pivot on bolts 16, 16A and lever arms 18, 18A, 18B and 18C pivot on bolts 19, 19A to the position shown in FIG. 3. Wheels 11 and 12 roll onto drag shoe 10A and come to a stop thereon. The lower face of drag shoe 10A slides to a stop on the road surface and stops the vehicle.

Since only a single unitary drag shoe is used for stopping rear wheels on opposite sides of the vehicle even braking is achieved, and the tendency for the rear end of the vehicle to skid sideways is less than it would be if only one rear wheel were braked or braking of rear wheels on opposite sides of the vehicle on a wet or snow covered road surface was not achieved substantially simultaneously. By securing the elastomeric sheet to the metal plate member firmly with bolts instead of using an adhesive and by not molding the elastomer on the metal plate member, the elastomeric cover can be easily and rapidly replaced when worn from dragging over the road surface. The drag shoe assembly can be pre-assembled and mounted on the vehicle frame with only two bolts 16 and 16A so installation is simple and can be made without the services of a skilled mechanic.

The plate member 13 of the drag shoe may be any suitable metal such as aluminum or brass but it is preferably a steel plate which may be rust proofed such as by zinc or copper plating or painting, if desired. The braking device provided by the invention may be associated with the wheels of any type vehicle including a passenger car but it is principally useful for installation on tractor-trailer rigs.

The mat or pad between the lower face of the metal plate and the road surface should be a material having a high coefficient of friction and preferably a high abrasion resistance. Rubber has been identified herein as a suitable material and is intended to include both natural and synthetic rubbers such as polychloroprene. A substantially non-porous polyurethane elastomer is also contemplated and can be used to advantage because of its high abrasion resistance. A laminated elastomer-fabric material such as belting is particularly advantageous because of its wear resistance.

A spring backed trip hook assembly or similar locking device can be substituted for the ratchet 21A and pawl 50 assembly described above. Likewise the width of the drag shoe may be sufficient to underly all of the rear wheels on both sides of the trailer, if desired.

Although the invention has been described in detail to illustrate the invention, it is to be understood that such detail is solely for that purpose and those skilled in the art can make variations therein without departing from the spirit and scope of the invention except as it is limited by the claims.

What is claimed is:

1. An auxiliary braking device for a wheeled vehicle having a frame, said braking device comprising a drag shoe to be disposed transversely across the vehicle and between a wheel on each side of the vehicle and a road surface, and means on each of opposite sides of the vehicle for supporting the drag shoe on said frame, said drag shoe comprising a rigid, substantially flat, metal plate member having leading and trailing edges disposed transversely across the vehicle and supported on the said frame, said plate member spanning the transverse rear wheel base of the vehicle, said plate member having a first surface facing the underlying road surface and a second surface facing said rear wheels when the braking device is in an operative position on the vehicle with the longitudinal axis of the plate member substantially perpendicular to the longitudinal axis of the vehicle, a flange integral with the plate member and upstanding from said second surface substantially parallel to and adjacent to the leading edge of the plate member, an easily removable elastomeric sheet covering said first surface folded about the said leading edge and over said flange, a first series of laterally spaced bolts securing the said sheet to said flange, said sheet being folded about the trailing edge of the plate member and overlapping a portion of said second surface, a second series of laterally spaced bolts securing said overlapping portion of the sheet to the plate member, that portion of the sheet between said series of bolts being substantially taut with the sheet disposed against but not bonded to the plate member whereby the sheet can be removed from the plate member upon removal of said bolts, said means for supporting said drag shoe on said frame in front of said rear wheels in a stored inoperable position and for guiding the drag shoe as a unit to the road surface in the paths of said rear wheels when actuated comprising on each side of the vehicle a first bar pivotally secured at one end to said frame and depending therefrom in front of a rear wheel, a second bar pivotally secured to the first bar and fixed to said leading edge of said drag shoe, a cable for lifting said drag shoe from the road surface to an inoperable folded stored position, means comprising a winch supported on said frame for shortening said cable to lift said drag shoe, means for supporting said drag shoe in its inoperable position comprising a quick release device and chain fixed to the drag shoe and to the quick release device for holding the drag shoe on the frame above the road surface, means for releasing said quick release device to release the chain and the first and second bars to permit the said support means and the drag shoe to unfold and drop the drag shoe to the road surface in the paths of rear wheels, a post-like stop member upstanding from said second surface, and a resilient pad fixed to said first bar and associated with said stop member on said plate member to prevent the first and second bars from folding so tightly they fail to unfold when the said chain is released.

2. The auxiliary braking device of claim 1 wherein said elastomeric sheet is rubber.

3. The auxiliary braking device of claim 1 wherein the said plate member is a rectangular steel plate.

4. The auxiliary braking device of claim 1 mounted on a trailer of a tractor-trailer rig.

5. A trailer of a tractor-trailer rig having wheels and a frame and a braking device comprising a drag shoe supported on said frame, said drag shoe comprising a rigid, flat, metal plate member having leading and trailing edges disposed transversely across the trailer below the said frame and spanning the track of the rear wheels on opposite sides of the vehicle, said plate member having a first surface facing the underlying road surface covered with an elastomer and a second surface facing said rear wheels when the braking device is in an operable position between said rear wheels and a road surface with the longitudinal axis of the plate member substantially perpendicular to the longitudinal axis of the trailer, a flange integral with the plate member and upstanding from said second surface substantially parallel to and adjacent to the leading edge of the plate member and an upstanding post-like stop member fixed to the plate member, a first bar pivotably secured at one end to said frame and depending therefrom in front of a rear wheel on each side of the vehicle, a second bar pivotably secured to the first bar and secured to said leading edge of said drag shoe, a cable fixed to said drag shoe, a winch supported on the frame for shortening the cable for lifting said drag shoe from the road surface to an inoperable folded stored position, a ratchet and pawl assembly supported on said frame, a chain connected to said drag shoe and releasably connected to said ratchet to release the drag shoe to drop on the road surface in front of a rear wheel upon rotation of the ratchet, and a resilient pad fixed to said first bar and associated with said stop member on said plate member to prevent the supporting means from folding so tightly it fails to unfold under the weight of the drag shoe when the said chain is released.

6. The braking device of claim 5 wherein said cable is adapted for securing to the said ratchet and the length of said cable between the ratchet and drag shoe is longer than the distance therebetween whereby the cable is slack and does not interfere with dropping of the drag shoe to the road surface when the ratchet is actuated to release the said chain and cable.

7. An auxiliary braking device for stopping in an emergency a wheeled vehicle having a frame and a pair of facing wheels supporting opposite sides of said frame, said braking device comprising a drag shoe to be disposed between said wheels and an underlying road surface comprising a substantially rectangularly shaped plate member having leading and trailing edges to be disposed substantially perpendicular to the longitudinal axis of the vehicle when the drag shoe is supported on the vehicle, said plate member having a cover having a higher coefficient of friction then said plate member between the leading and trailing edges of the face of the plate member which contacts the road surface when the plate member is disposed in an operable position between a wheel and the road surface which cover is removably secured to the plate member, a post member upstanding from said plate member, and, on each of opposite ends of the drag shoe, means for releasably supporting the drag shoe transversely on the vehicle frame between the frame and the road surface where it will drop, when released, to the road surface in the path of the said wheels comprising an upstanding first bar fixed to the plate member adjacent to its leading edge, a second bar pivotably fixed adjacent to one end to said frame and adjacent to its opposite end to said first bar, a ratchet and pawl assembly supported on the said frame in front of said wheel, a first chain fastened to said plate member and releasably fastened to said ratchet to support the drag shoe in a folded inoperable position, a second chain fixed to said frame and fixed to the drag shoe for limiting the longitudinal movement when the drag shoe drops from its inoperable folded raised position to a position where the plate member is disposed between the wheel and road surface, winch means associated with said frame and said plate member for lifting the drag shoe to an elevated folded position until said first and second bars fold and said post member contacts the second bar to prevent further folding, and means for releasing said first chain from said ratchet to permit the drag shoe to drop to the road surface.

* * * * *